(12) United States Patent
Zündt et al.

(10) Patent No.: US 11,982,923 B2
(45) Date of Patent: May 14, 2024

(54) APPARATUS FOR ILLUMINATING A SUBJECT AREA

(71) Applicant: Zündt's Filmgeräteverleih GmbH, Kirchheim-Heimstetten (DE)

(72) Inventors: Alexander Zündt, Munich (DE); Ralph Zündt, Taufkirchen (DE)

(73) Assignee: ZÜNDT'S FILMGERÄTEVERLEIH GMBH, Kirchheim-Heimstetten (DE)

( * ) Notice: Subject to any disclaimer, the term of this patent is extended or adjusted under 35 U.S.C. 154(b) by 0 days.

(21) Appl. No.: 17/607,523

(22) PCT Filed: Apr. 28, 2020

(86) PCT No.: PCT/EP2020/061807
§ 371 (c)(1),
(2) Date: Oct. 29, 2021

(87) PCT Pub. No.: WO2020/221771
PCT Pub. Date: Nov. 5, 2020

(65) Prior Publication Data
US 2022/0206367 A1    Jun. 30, 2022

(30) Foreign Application Priority Data

Apr. 29, 2019    (DE) .......................... 102019111015.7

(51) Int. Cl.
*G03B 15/06*    (2021.01)
(52) U.S. Cl.
CPC ...... *G03B 15/06* (2013.01); *G03B 2215/0567* (2013.01); *G03B 2215/0585* (2013.01)

(58) Field of Classification Search
CPC .............. G03B 15/06; G03B 15/07; G03B 2215/0567; G03B 2215/0585
See application file for complete search history.

(56) References Cited

U.S. PATENT DOCUMENTS

| 4,210,952 | A  |   | 7/1980  | Ressmeyer |           |
|-----------|----|---|---------|-----------|-----------|
| 10,865,972| B2 | * | 12/2020 | Yellin    | F21V 1/06 |
| 2008/0049438 | A1 |   | 2/2008  | Bloemen et al. |      |
| 2009/0002997 | A1 | * | 1/2009  | Koester   | F21K 9/68 |
|           |    |   |         |           | 362/296.01|
| 2010/0188752 | A1 |   | 7/2010  | Briese    |           |

(Continued)

FOREIGN PATENT DOCUMENTS

| CN | 105240709   | 1/2016  |
| DE | 10216085    | 11/2003 |
| DE | 102013004665| 9/2014  |

(Continued)

OTHER PUBLICATIONS

PCT International Search Report and Written Opinion (w/ English translation) for corresponding Application No. PCT/EP2020/061807, dated Sep. 18, 2020, 18 pages.

(Continued)

*Primary Examiner* — Christopher E Mahoney
(74) *Attorney, Agent, or Firm* — Dority & Manning, P.A.

(57) ABSTRACT

A device for illuminating a motif region, comprising a reflector screen that comprises at least one reflection element, wherein the device includes at least one lighting means comprising at least one LED lamp, in particular a plurality of LED lamps, for illuminating a motif region, at least in portions.

18 Claims, 8 Drawing Sheets

(56) References Cited

U.S. PATENT DOCUMENTS

2012/0026717 A1 2/2012 Lin
2013/0322051 A1 12/2013 Ortiz-Gavin

FOREIGN PATENT DOCUMENTS

| EP | 0225105 | 6/1987 |
| EP | 2295849 | 3/2011 |
| WO | WO2013098678 | 7/2013 |
| WO | WO2013178222 | 12/2013 |

OTHER PUBLICATIONS

Dedo Weigert Film GmbH, "TechPro Felloni Turbo", (with English translation), https://www.dedoweigertfilm.de/dwf-en/medias/PDF/Tecpro/FLTP_Felloni3_Turbo_ENG_0718-low.pdf, 2018, 8 pages.

* cited by examiner

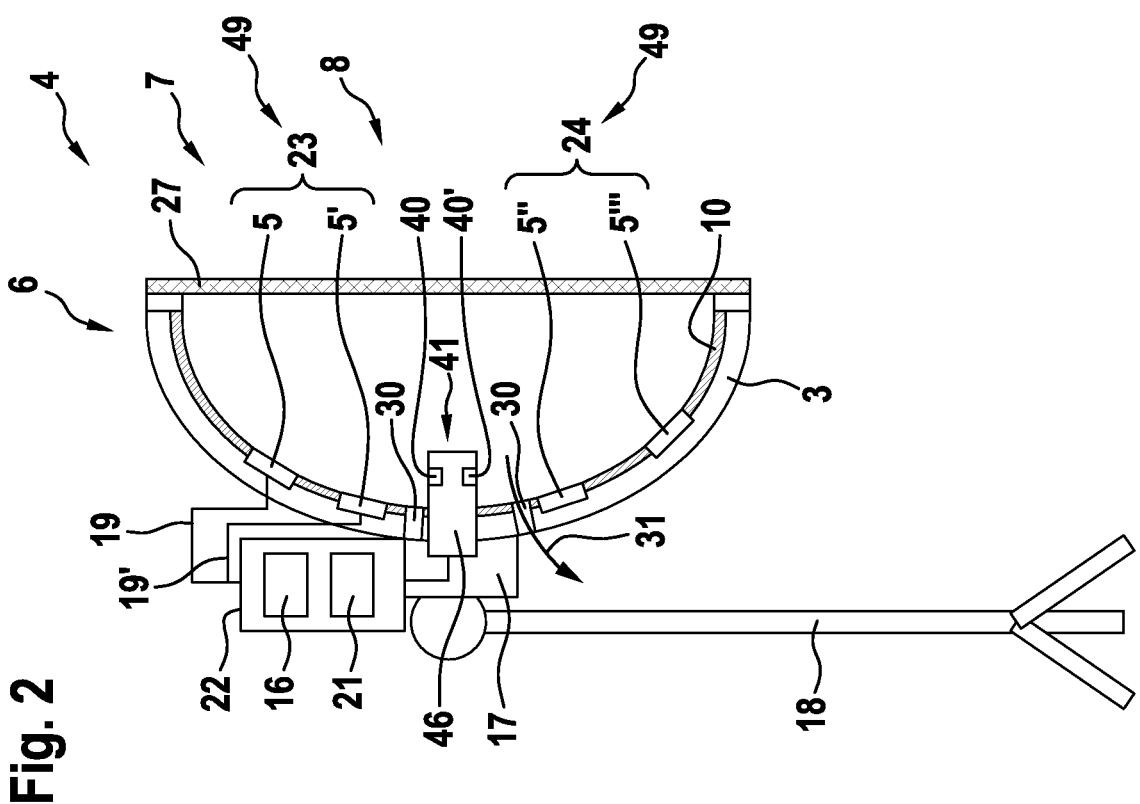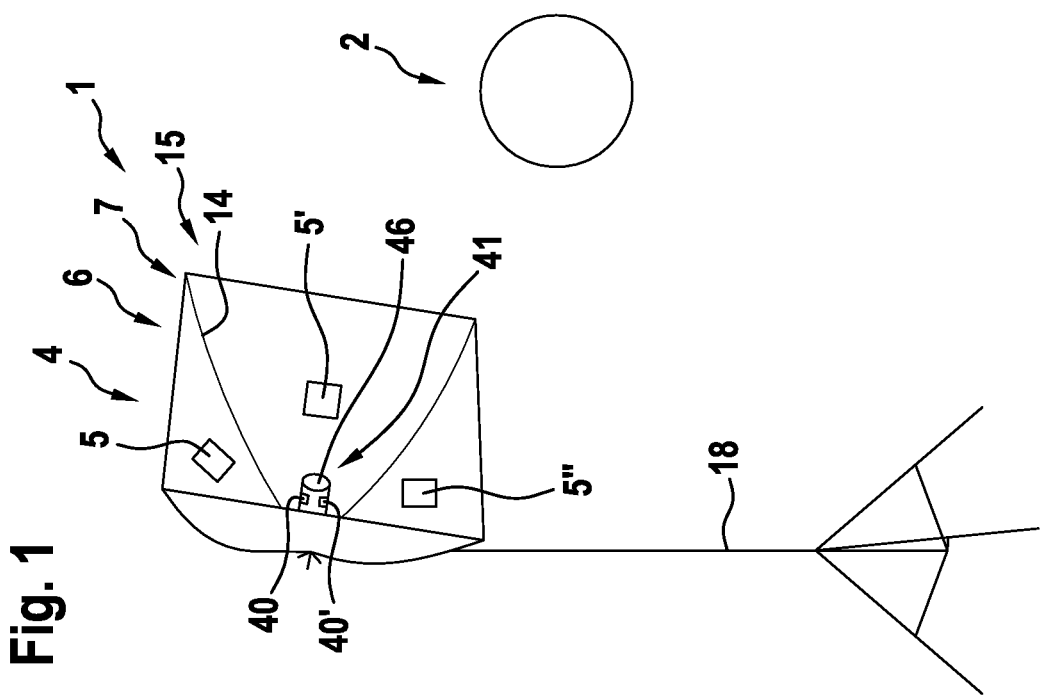

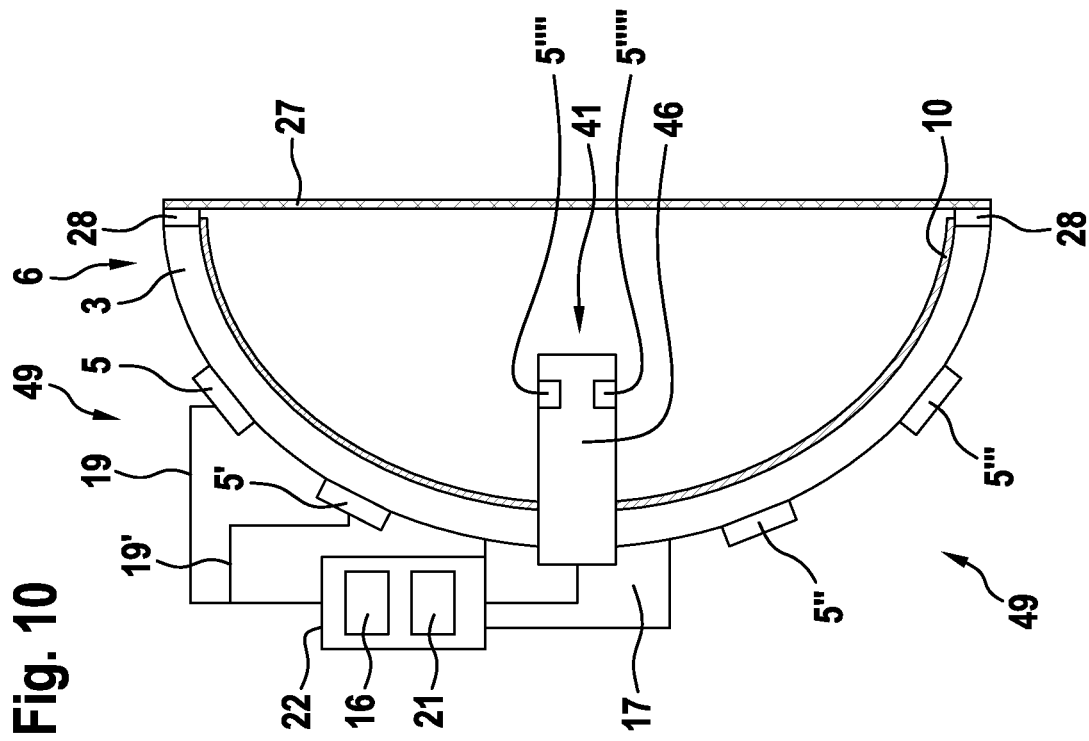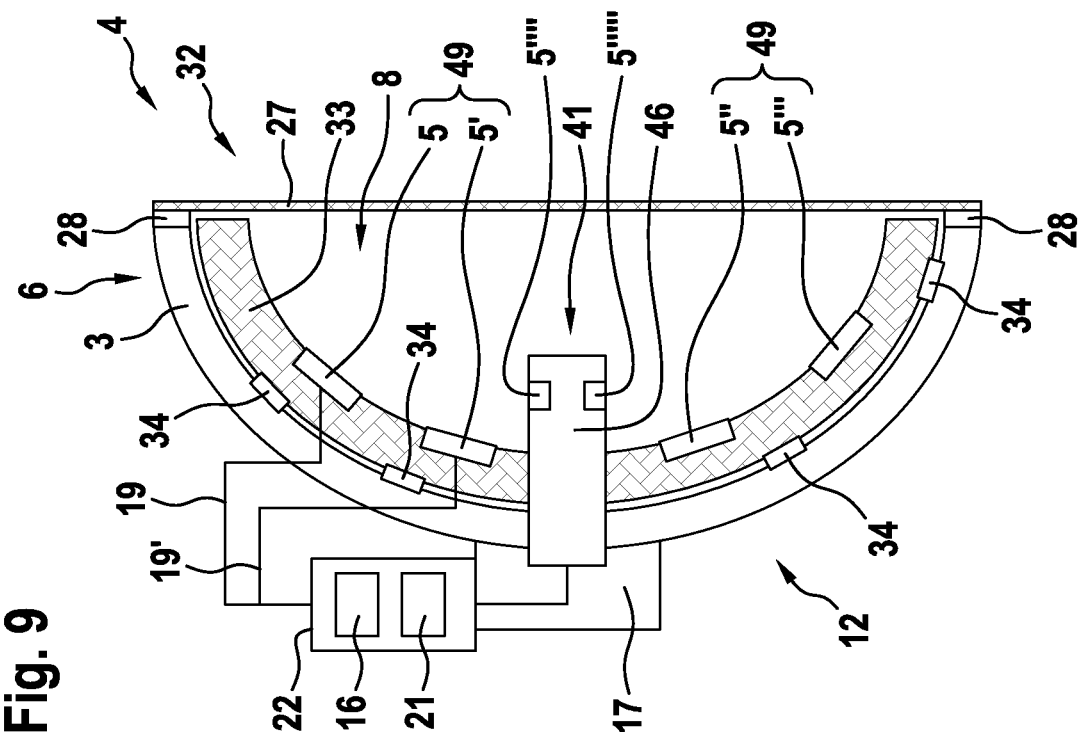

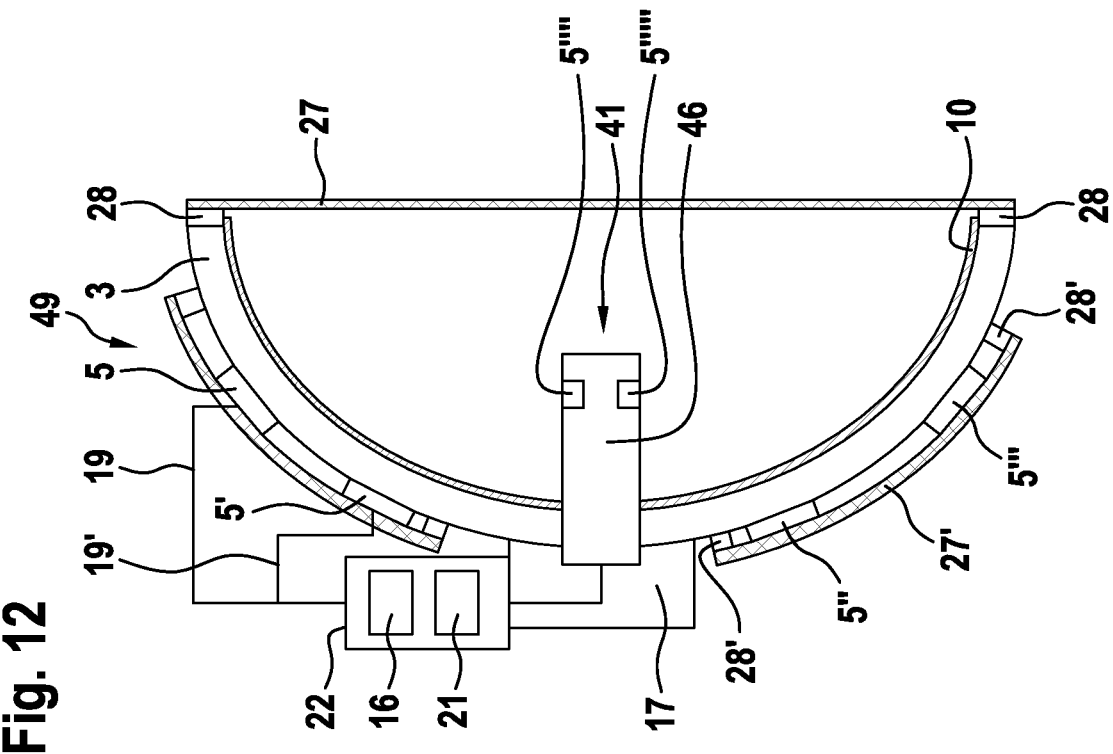
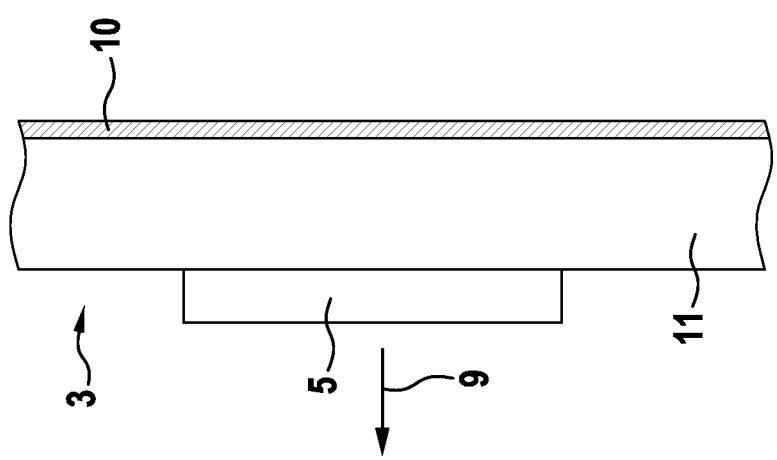

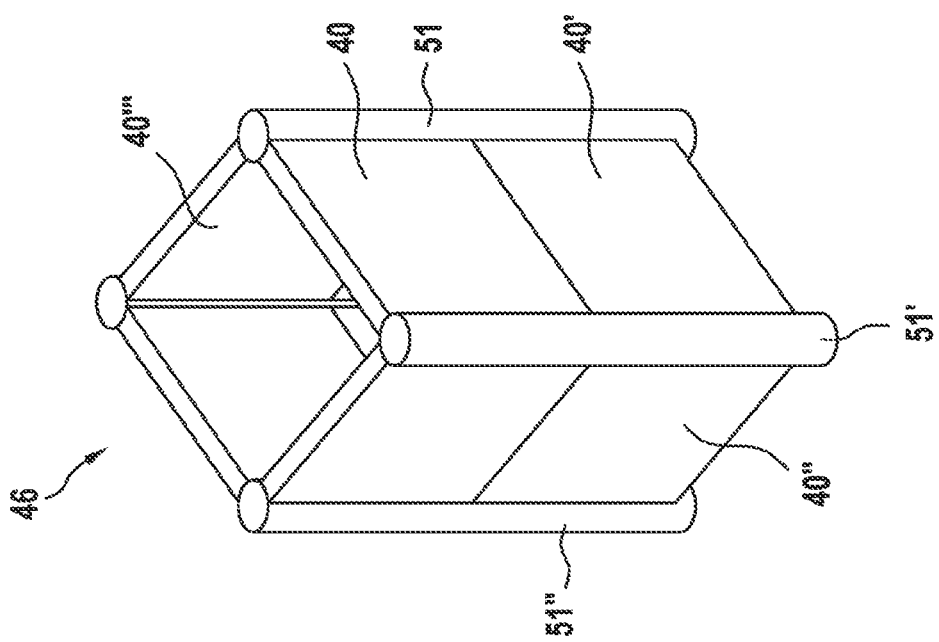

APPARATUS FOR ILLUMINATING A SUBJECT AREA

The present application is a U.S. national phase application of International Application No. PCT/EP2020/061807, filed Apr. 28, 2020, which, in turn, claims the right of priority to German Application No. 102019111015.7, filed Apr. 29, 2019, the disclosures of both of which are hereby incorporated by reference herein in their entirety for all purposes.

The invention relates to a device for illuminating a motif region, comprising a reflector screen comprising at least one reflection element.

Corresponding devices for illuminating a motif region, comprising a reflector screen comprising a reflection element, are known in principle from the prior art. For example, screen-like devices provided with a reflective material on the inside of the screen are known by the term "softbox". These receive a lamp in the centre thereof, the emitted light of which lamp is radiated or directed to a motif region. Devices of this kind are relatively heavy and cumbersome in the state fitted with a lamp. The power supply of the lamp must also be handled, in addition to the device itself. Finally, the field of application of the lamp used can be restricted, such that it is necessary to transport along a plurality of lamps in order to use the correspondingly acting lamp depending on the case of use.

The object of the invention is that of specifying a device for illuminating a motif region, which device in particular offers simple and manageable handling, as well as a large scope of performance with respect to the lighting possibilities or the illumination of the motif region.

The object is achieved by a device for illuminating a motif region according to claim 1. The dependent claims relate to possible embodiments of the device.

The invention relates to a device for illuminating a motif region, comprising a reflector screen comprising a reflection element.

The device is characterized in that the device comprises at least one lighting apparatus which comprises at least one LED lamp, in particular a plurality of LED lamps, and is intended for illuminating a motif region, in particular directly, at least in portions. Direct illumination of the motif region means that the light emitted by the at least one LED lamp directly on the motif region or on a motif body to be illuminated, i.e. on a direct path or without an object located in space being in the way in between the LED lamp and the motif object of the motif region. In this connection, an attachment element, e.g. a filter, through which the light penetrates, or light reflected on a reflective surface of the reflector screen, is also to be understood as being on a direct path. In the case of indirect illumination of the motif region, the at least one LED lamp is arranged such that the light emitted by the LED lamp is "deflected" towards the motif object, not on a direct path but rather only after reflection thereof on a reflective surface which is not to be located with the device itself, i.e. is not part of the reflector screen itself, e.g. a wall or ceiling of a room. If the light emitted by the LED lamp undergoes a reflection at reflective surfaces of the device itself and subsequently directly reaches the motif region, this is to be understood as direct illumination.

It is possible for the at least one reflection element to be designed to form a three-dimensionally shaped, in particular curved, body comprising a light output opening, through which light output opening the light emitted by a lighting apparatus or by at least one LED lamp of the lighting apparatus can escape to a motif region. In this case, at least one lighting apparatus is arranged or formed at least in portions in an interior of the body that is three-dimensionally shaped, at least during the intended use. The illumination of a motif object in the motif region can generally comprise the generation of different light and/or shadow effects, as well as influencing of the image characteristics or the effect of the motif object. Typically, devices of this kind are used for illuminating a motif object of a motif region in the case of photograph and/or film recording, wherein flash light or continuous light means are used. In this case, the LED lamps described herein should be used primarily as a continuous light source. In this case, a change in the location and/or the orientation of the device for illuminating a motif region may be required, such that a low weight and good manipulability are desirable. Since the reflector screen, in particular the reflection element, is provided with at least one LED lamp, and in particular in the case in which the device does not comprise any further lamps besides the LED lamps, the overall weight of the device is relatively low and can easily be moved or held using one hand.

It is possible for the lighting apparatus to be arranged in a central region of the three-dimensionally shaped body. In particular if the three-dimensional body is designed so as to be reflective, at least in portions, at the regions thereof facing the lighting apparatus, it is advantageous for the lighting apparatus to be arranged centrally. The central arrangement, in particular the arrangement of the lighting apparatus on a mirror axis of the three-dimensional body, optimises the reflective properties of the three-dimensional body for the light emitted from the lighting apparatus.

It may be possible, for example, for the lighting apparatus to be arranged on an in particular rod-like carrier. The rod-like carrier can preferably be arranged on or in parallel with an axis, in particular an axis of symmetry, of the three-dimensionally shaped body. In this case, the at least one LED lamp of the lighting apparatus can be arranged on the end of the rod-shaped carrier remoted from the three-dimensional body. Since the LED lamp is spaced apart from the three-dimensional body, and thus from the reflective regions of the reflection element, advantageous radiation of the light emitted by the LED lamp can be achieved.

It is possible for at least one LED lamp to be movably mounted on the carrier, and/or for a carrier bearing at least one LED lamp to be displaceable relative to the reflector screen and/or relative to the reflection element, in particular at least one LED lamp is displaceable along or in parallel with the longitudinal axis of the carrier relative to the carrier, and/or the carrier is displaceable along or in parallel with the longitudinal axis thereof relative to the reflector screen. The movable mounting or the at least temporary movability exists in each case, in the case of a construction of the device that is provided as intended for the illuminating insert, i.e. for example in the case of a constructed device or in the case of a constructed domed body, this remains at least substantially unchanged with respect to the curvature thereof or with respect to the three-dimensional extension thereof, and merely a relative displacement of at least one LED lamp with respect to a reflector screen, in particular with respect to a reflection element, is carried out. The fact that the reflector screen can have a different curvature at different regions makes it possible for the angle of incidence of the light emitted from the LED lamp, on the reflective surface of the reflector screen, to be able to be changed or varied, by moving the LED lamp relative to the reflector screen or relative to the reflection element. This leads to a change in the illumination characteristics in the motif region, and thus forms a further design possibility for the illumination of the motif region.

The movability of the LED lamp relative to the carrier, and/or the movability of the carrier relative to the reflector screen, can be blockable, at least temporarily, by a blocking means. In other words, the blocking means makes it possible for the movability of the at least one LED lamp relative to the reflector screen or relative to the reflection element to be stopped, at least temporarily. In this case, a carrier that is mounted so as to be movable relative to a reflection element can optionally or additionally be designed so as to be lockable.

It is possible for at least one LED lamp of the lighting apparatus to be designed to emit light radially from the carrier, in particular radially with respect to a longitudinal axis of the carrier. In this case, a radial emission of light from the carrier means that, in plan view, the light extends away for example in a beam-like manner, proceeding from the centre of the LED lamp, but in side view, i.e. along the longitudinal axis of the carrier and/or along the lamp of the reflector screen, can be emitted within an angular range of from 10 to 170°, preferably in an angular range of from 15 to 165°, particularly preferably in an angular range of from 20 to 160°.

In a preferred embodiment, the device comprises at least one further lighting apparatus comprising at least one further LED lamp, in particular the at least one further LED lamp is arranged in or on the reflection element. As a result, the device consists of a first, in particular centrally arranged, lighting apparatus comprising first LED lamps, and a further, in particular decentrally arranged, lighting apparatus comprising at least one second LED lamp, wherein the further lighting apparatus is arranged or formed in or on the reflector screen and/or in or on the reflection element, in particular the at least one further LED lamp is arranged or formed in a non-central region of the reflector screen, whereas the first LED lamp of the first lighting apparatus is arranged in a central region of the reflector screen.

The at least one further LED lamp of the further lighting apparatus can for example be arranged in or on a component of the reflector screen or in a component of the reflection element.

Alternatively or in addition, at least one LED lamp can be arranged on the side of the reflector screen, in particular of the reflection element, facing the light output opening.

At least one first and/or one further LED lamp can also be arranged on the side of the reflector screen, in particular of the reflection element, remote from the light output opening. In this case, the reflector screen or the reflection element comprises an opening and/or a transparent portion and/or a translucent portion, at least in portions, which is arranged relative to the LED lamp such that the light emitted by the LED lamp can pass through the opening the transparent portion, and/or the translucent portion, in order to reach a motif region via the light output opening. Finally, it is possible for a first LED lamp to be arranged on a side of the reflector screen, in particular of the reflection element, facing the light output opening, and for a second LED lamp to be arranged on a side thereof remote from the light output opening, or in a component of the reflector screen, in particular of the reflection element.

The three-dimensional, in particular domed and/or curved, body, formed by the at least one reflection element at least in portions, can for example be symmetrical or asymmetrical in shape, at least in portions. For example, the three-dimensional, in particular domed, body is in the shape of a rotationally symmetric body, i.e. the body can be rotated about defined angles at an axis, in particular at the longitudinal axis thereof, and in the process projects itself on itself. This can also be referred to as n-fold rotational symmetry. Alternatively or in addition, the three-dimensional, in particular domed, body can also be rotationally symmetrical in shape. For example, the three-dimensional body is in the shape of a pyramid, a truncated pyramid, a cone, and/or a truncated cone, at least in portions. In this case, the three-dimensional body can form a the shape of a straight or oblique geometric body, in particular polyhedron. The base surface and/or optionally the top surface of the geometrical body, in particular a geometric body in the shame of a truncated pyramid or truncated cone, can be that of an equilateral, equiangular, symmetrical and/or asymmetrical n-gon (polygon). The lateral surface of the geometric body can have a straight course, at least in portions, in cross section; alternatively or in addition the lateral surface can also be of a shape that is curved in cross section, at least in portions.

Alternatively or in addition, it is possible for example for the light output opening or a projection of the edge of the light output opening to be n-gonal in shape, e.g. to be in the shape of an equilateral, an equiangular, or a regular polygon, which is located in particular in a main extension plane of the light output opening, i.e. in a plane formed by the light output opening. The three-dimensional, in particular domed, body can for example be in the shape of a trough, a pot, or a funnel, wherein a trough opening or a pot opening forms the light output opening, such that the LED lamp can preferably be arranged in an interior of the trough-like, pot-like, or funnel-like body.

The three-dimensional, in particular domed, body can be formed for example by a single reflection element or by a plurality of reflection elements. In the case of using a plurality of reflection elements, these can be arranged so as to overlap, for example at least in the use position of the device or of the reflector screen, such that the transitions of the individual reflection elements forming the three-dimensional, in particular domed, body are formed without interruption. The domed shape of the body can allow for a reflection, at the inside or at the surface region facing the light output opening, of the light striking said surface, and thus allow for collimation, bundling, and/or focussing of the light provided by the device for illumination of the motif region. In other words, an uncontrolled propagation of the light emitted by the device for illuminating the motif region is prevented. This collimated, bundled and/or focussed light can have been generated by at least one first LED lamp and/or by at least one further LED lamp.

Alternatively or in addition, it is possible for the at least one reflection element to be designed to form a three-dimensionally shaped, in particular curved, body having a reflection region intended to face or facing the motif region, wherein the at least one LED lamp is arranged on the side of the reflection element remote from the reflection region, such that the light emitted by the at least one LED lamp reaches the motif region for the purpose of indirect illumination. As a result, a device is provided which makes it possible to perform indirect illumination of the motif region by means of the LED lamps of said device. In this case, the three-dimensionally shaped body of the at least one reflection element can on the one hand be used as a carrier means for carrying the at least one LED lamp, and on the other hand as a structural means for preventing direct illumination from at least one LED lamp carried by the reflection element, such that at least this one reflection element can be used exclusively indirectly for illumination of the motif region. In this case, the reflection element can optionally comprise a reflective surface which, when used as in tended, is directed towards or faces a motif region. The reflective surface can serve to reflect light directed to the device from the motif region side, and can thus contribute during the illumination of the motif region, as a surface or component of the device acting passively on the illumination of the motif region.

It is also possible, for example, for the reflector screen and in particular the reflection element not to comprise any reflective or mirrored regions for the light emitted by the device via the at least one lighting apparatus. In this case, the in particular umbrella-like reflector screen serves as a solid body for retaining the at least one lighting apparatus, and simultaneously as an obstacle for preventing incidence of light into the motif region from light or reflection sources located behind the device.

In a preferred embodiment, the at least one LED lamp is arranged or formed in or on the side of the reflection element facing the light output opening. This can be advantageous in that, in the case of a foldable reflector screen, in the folded state thereof the at least one LED lamp is located in the interior of the folded reflector screen, and as a result the at least one LED lamp is protected against mechanical influences.

It is possible for the at least one lighting apparatus and/or the at least one LED lamp to be releasably or non-releasably fastened in or on the reflector screen, in particular in or on the reflection element. A releasable, i.e. non-destructively releasable, fastening of the at least one LED lamp on the reflector screen or in or on the reflection element allows for replacement of a for example faulty LED lamp. It may for example be possible for several (i.e. at least two, preferably a plurality of) possible fastening locations for the fastening of an LED lamp in or on a reflector screen, in particular in or on a reflection element, to be present, and optionally all the possible fastening locations can be provided with an LED lamp, or an LED lamp can be placed or fastened selectively, at desired fastening locations. It is thus possible for a desired arrangement of a plurality of LED lamps in or on the reflector screen, or in or on the reflection element, to be carried out, depending on the aim of the illumination or of the light and/or shadow effect that is to be generated at the motif region. It is thus possible for example for a plurality of LED lamps to be arranged homogeneously and/or symmetrically within the surface of the reflection element in a first configuration, and inhomogeneously or asymmetrically in a second configuration. The releasable fastening can preferably be designed or established such that dismantling and/or assembly of the at least one LED lamp without tools is made possible. For this purpose, the reflection element can be connectable, at the possible fastening locations for an LED lamp, to an energy supply unit via an energy supply interface. Alternatively or in addition, it is possible, by virtue of the variable placeability of the LED lamps, for a first LED lamp to be placed, in a first placement on the reflector screen a central position forming the first lighting apparatus, and in a further placement or in a further configuration of said LED lamp on a decentral region is used for forming the further, decentral lighting apparatus at least in part.

It is possible for the reflector screen to comprise a folding mechanism and at least one, in particular flexible, reflection element, wherein the reflection element can be displaced by the folding mechanism between a stretched or extended use position and a folded or retracted non-use position. The stretched use position means that, in this position, the at least one reflection element has a larger extent than in the folded non-use position, and/or that, in this position, the at least one reflection element is positioned and/or oriented such that at least one device-side lamp, in particular at least one device-side LED lamp, illuminates the motif region by emitting light, or that the emitted light can be used for illuminating the motif region. In this case, the use position forms an arrangement and/or orientation of the at least one reflection element having a larger expansion than is the case in a non-use position; in the non-use position the device, and in particular the at least one reflection element, occupies a more compact volume than in the use position. The folding mechanism can for example be constructed in the manner of an umbrella; in this case, the reflection element can typically have a property that is flexible and/or resilient at least in portions, such that a tension preferably acts on the reflection element in the use position. In this case, the mentioned relative displaceability of at least one LED lamp with respect to a carrier, or the relative displaceability of the at least one carrier with respect to a reflector screen, relates to a displaceability which arises without collapsing or folding the reflector screen. In other words, during the displacement of the carrier, in particular of the LED lamp, possibly despite certain geometry changes, in particular at least of reflective portions of the reflector screen, the reflector screen remains in the use position thereof.

This can prove to be advantageous if an, in particular rechargeable, electrical energy storage unit for energy supply of the at least one lighting apparatus and/or of the at least one LED lamp is arranged in or on the reflector screen, in particular the energy storage unit is releasably fastened in or on the reflector screen. Since an illumination of the motif region takes place at least in part by means of LED lamps, a relatively small and lightweight energy supply unit or energy storage unit can be used for the energy supply thereof. Since the energy supply unit or the energy storage unit is so compact and lightweight, the manipulability of the device, in particular in the case of a change of location of the device, is increased. The energy storage unit can be operated at an electrical voltage, in particular an output voltage, of from 10 to 24 volts, in particular 12 to 16 volts. The performance of the energy supply unit can for example be 60 to 250 Wh. Optionally, the energy storage unit can be connected to the reflector screen by means of a fastening or connection that is releasable, in particular that is releasable without tools. For this purpose, for example at least one energy storage unit can be able to be connected to the reflector screen, in particular to the reflection element, by means of an energy supply interface. In this case, it can prove to be advantageous for the energy supply interface or the fastening of the energy storage unit to be designed as a standardised interface or as a standardised fastening interface. For example, the energy supply unit can be releasably connected to the reflector screen, in particular to the at least one reflection element, by means of what is known as a V-mount interface. The energy storage unit can for example supply the first and the further lighting apparatus and/or the first and the further LED lamp with electrical energy.

The use of at least one LED lamp allows for recourse to an electrical battery and/or an electrical accumulator for the power supply of the LED lamp, which has a low weight and a small volume, such that this also contributes to good manipulability of the device for illumination. The at least one lighting apparatus and/or the at least one LED lamp can for example be connected or connectable to the energy storage unit via an electrical line connection, wherein the line connection is arranged or designed such that the line connection undergoes no or one bend, in particular no or one fold, during a displacement of the reflection element between the use position and the non-use position; preferably the line connection is designed so as to extend at least largely radially with respect to a fold centre of the reflector screen. Since the line connection undergoes no or as little bending as possible, the risk of a line break is reduced. In particular if the reflector screen comprises an umbrella-like folding movement between a use position and a non-use position, it may be advantageous for at least some, in particular all, of the line connections to extend radially from a fold centre, since in this case there is no or only a low risk of bending, in particular folding, of the line connections. The reflector screen can comprise reinforcing elements, e.g. struts, which supports and/or braces at least one flexible reflection element at least during the use position. It is possible for at least one line connection to extend at least in portions, in particular largely, in or on a reinforcing element. An LED lamp consists of a light-emitting diode, and thus of a light-emitting semiconductor component, the electrical properties of which correspond to a diode.

It is possible for a control unit to be provided, which can be or is associated with the at least one lighting apparatus and/or the at least one LED lamp, and by means of which at least one illumination parameter of the LED lamp, in particular the lighting intensity and/or the colour temperature and/or the light colour of the at least one lighting apparatus and/or of the at least one LED lamp can be changed, at least in portions. Alternatively or in addition, the control unit can change the at least one illumination parameter in a temporally varying manner. The device can also for example comprise a first group comprising at least one LED lamp and a second group comprising at least one LED lamp, wherein the first and the second group of LED lamps can be actuated independently of one another by means of a control unit which can be or is associated with the first and second group of LED lamps. The actuation can relate to the illumination parameters of the relevant LED lamps, and/or the association of at least one LED lamp with a defined group. In order to actuate the LED lamps, for example each individual LED lamp can be indirectly or directly connected to the control unit. Since the illumination parameters of the at least one LED lamp can be changed, it is possible to intervene in the action of the device during the illumination of a motif region in a simple and convenient manner, such that a purposeful change or influencing of the light and shadow effects in the illuminated motif of the motif region can be achieved. In this case, the control unit can actuate both the first and the further lighting apparatus, and thus in particular influence both the central and the decentral light generation within the three-dimensionally shaped body.

The control unit can for example be connected to a portable electronic terminal or to an electronic mobile device, by means of a wired or wireless data connection for exchange of data, in particular of control data. The control unit itself can also be designed as the portable electronic terminal. For example a Smartphone, a tablet computer, and/or a portable computer (e.g. laptop) can be used as the electronic terminal. A wireless connection of the electronic terminal can be formed by means of a radio link, in particular as a short-distance radio link (e.g. Bluetooth connection). The data connection can for example be designed as a unidirectional or bidirectional connection.

It is also advantageous, for example, for the device to comprise a first group comprising at least one first and/or one further LED lamp, and a second group comprising at least one first and/or one further LED lamp, wherein the LED lamps of the first group differ from the LED lamps of the second group in at least one parameter of the light which can be radiated thereby in each case. These parameters can for example in particular relate to the lighting intensity, the colour temperature, and/or the light colour. For this purpose, the grouped LED lamps can be designed so as to be variably actuatable by means of a control unit, or can have an invariable form or property that is different at least in one parameter, or can have that of the emitted light, such that for example a first group of LED lamps emits light in a first colour temperature, and a second group of LED lamps emits light in a colour temperature different from the first colour temperature, and an effect acting on the basis of the colour temperature of the illumination of the motif region can be achieved by corresponding activation or deactivation of the relevant group of LED lamps. In other words, setting of the overall emission characteristics of the device for illuminating a motif region can be achieved by different actuation of the at least two groups of LED lamps.

The at least two groups of LED lamps can be distributed homogeneously and/or inhomogeneously over the domed body or over the at least one reflection element. For example it is possible that, in particular exclusively, a first group of LED lamps, in the use position of a reflector screen designed in an umbrella-like manner, may be arranged or formed in a sector portion located between two lines that extend radially from a fold centre of the reflector screen that is in the use position.

It is possible for the device for illuminating a motif region to comprise a connection region which is arranged or formed in or on the reflector screen, in particular in or on a reflection element, preferably in or on an edge region of the light output opening, and is intended for at least temporary connection of the connection region to an attachment element. The attachment element can be designed for example as a diffusor, spot attachment, shielding flap, mask, foil filter, glass colour filter, and/or honeycomb filter attachment. In this case, the attachment element can cover, at least in portions, LED lamps located on the region of the reflector screen, in particular of the reflection element, facing and/or remote from the motif region, and in the process change the lighting characteristics of the LED lamp. In this case, a diffusor is to be understood as an accessory via which hard direct light can be perceived, in impression, as softer, and extreme light/shadow contrasts as well as possible disturbing reflexes are reduced. The diffusor can for example be designed as a semi-translucent material and can be connected to the reflector screen, via the connection region, for example as an in particular white sheet or as a flexible element, in the region of the light output opening of the three-dimensional, in particular domed, body. The connection of the attachment element to the reflector screen can preferably be achieved by a releasable force-fitting and/or interlocking connection, e.g. this is designed as a hook and loop connection. As a result, illumination through the attachment element is possible.

The first lighting apparatus can for example be arranged in a central region of the reflector screen, and/or on a main axis of extension of the reflector screen, and/or on a straight line extending perpendicularly to the main axis of extension of the reflector screen. For this purpose the reflector screen can for example comprise a recess, in particular a central opening, for receiving the first light apparatus or the at least first LED lamp, wherein a receiving means for releasably receiving the first lighting apparatus or the first lamp can be provided in the region of the recess or of the central opening. The receiving means can be designed for example as an annular element which, in addition to the receiving function for the at least one first LED lamp, furthermore assumes a stabilisation function for at least one component of the reflector screen, in particular at least one reflection element. It is thus optionally possible for struts or reinforcing elements to be fastened by means of the annular element, in particular in an orientation extending radially away therefrom.

An LED lamp designed as a daylight lamp is characterised by an emitted light having a colour temperature of from approximately 5300 to 6500 K and a spectral composition corresponding to natural light. The light emitted by the first LED lamp reaches the motif object or the motif region through the light output opening. As a result, the first LED lamp is an additional lamp in addition to the further LED lamp, wherein the first and/or the further LED lamp can be fastened to the device or removed, for example depending on the desired light effect.

It can prove advantageous for at least one ventilation opening to be provided, through which air may be able to pass, in particular flow, or through which air can pass, in particular flow, between the side of the reflector screen facing a light output opening and a side of the reflector screen remote from the light output opening, at least in the use state of the reflector screen. Since at least one ventilation flow is arranged or formed in the region of the at least one first and/or the at least one further lighting apparatus and/or in the region of the at least one first and/or further LED lamp, a gas exchange and in particular a cooling effect can be achieved on account of the airflow flowing there, such that thermal energy of the first LED lamp and/or of the further LED lamp can be transported away therefrom. The at least one ventilation opening can be designed so as to be in the form of a point, a line, or a surface, in particular slit-like ventilation openings are placed in at least one or between two adjacent reflection elements.

The at least one reflection element can for example be designed so as to be white, silver and/or gold in colour, at least in portions, at least on the side facing the light output opening. The reflection portion of the reflection element which is designed so as to be coloured in this way, at least in portions, allows for the reflection of the light striking it, and different light and/or shadow effects in the motif region can be achieved in a targeted manner by the respective specific colour design of the reflection portion. The reflective colour can be applied to the reflection portion of the reflection element for example as a coating.

FIG. 15 shows an in particular rod-shaped carrier which is made up of at least one carrier body, in particular of at least two carrier bodies. The at least two carrier bodies can be arranged so as to be spaced apart from one another, at least in portions, and can form an intermediate space or a receiving chamber therebetween. An LED lamp can be received in the intermediate space or receiving chamber. A gap or a through-opening, for example, can be present between the at least one LED lamp and a carrier body, and/or between at least two carrier bodies, and/or between at least two, in particular adjacent, LED lamps. A gap of this kind and/or a through-openings of this kind can serve to conduct through air, in particular for cooling the LED lamps.

At least one carrier body, in particular all the carrier bodies of the carrier, can have an elongate, preferably rod-like, shape. As shown in FIG. 15, the carrier bodies can be arranged or formed in an arrangement relative to one another that has a square, in particular a quadratic or a rectangular, basic shape. Alternatively, the carrier bodies and/or the LED lamps arranged in the intermediate spaces or receiving chambers can have a basic shape which is triangular and/or round and/or n-gonal, at least in portions. The carrier bodies and/or the LED lamps are preferably present or arranged relative to one another in a basic shape, and extend in the manner of a cylinder provided with just such a basic shape.

In a preferred embodiment, the carrier is formed for example by two, preferably three, particularly preferably four, most preferably by at least five, elongate carrier bodies, which are in particular arranged so as to be in parallel with one another.

The carrier bodies can be mutually supported or interconnected, in particular exclusively, by the LED lamps, and/or, in particular exclusively, by support means.

In addition to the device, described herein, for illuminating a motif region, the invention also relates to a reflector screen for a device described herein. It is thus possible for the reflector screen, in particular the at least one reflection element of the reflector screen, to be equipped with a fastening portion for releasable or non-releasable fastening of at least one, in particular at least one further, LED lamp. A fastening portion of this kind can be designed for example as a hook and loop connection. Furthermore, a reflector screen of this kind can be equipped with a fixing portion which is designed to releasably or non-releasably retain an energy storage unit.

In addition to the device, described herein, for illuminating a motif region and a reflector screen described herein, the invention also relates to an insert for mounting on a device for illuminating a motif region, wherein the device comprises a reflector screen comprising a reflection element, wherein the insert comprises at least one lighting apparatus comprising at least one LED lamp, in particular a plurality of LED lamps, and the insert can be arranged in or on the reflector screen, in particular in or on the reflection element, wherein in the mounted state of the insert in or on the reflector screen the at least one LED lamp can be used for illuminating a motif region, at least in portions. For example, one or more LED lamps are fastened to a carrier element and/or a carrier, and, by fastening the carrier element and/or a carrier to a reflector screen or a reflection element, can be connected to said reflector screen or reflection element. The carrier refers to the element that is arranged, in particular centrally, in the three-dimensionally shaped body, and carries the first lighting apparatus. The carrier element can bear a carrier that bears the first lighting apparatus, the further lighting apparatus, and/or the carrier that bears the first lighting apparatus. In the connected state, at least one LED lamp can be designed and/or oriented such that the light-emitting surfaces thereof are directed towards a light output opening of the domed body of the reflector screen, and the emitted light strikes the motif region after passing through the light output opening, at least in portions. An insert of this kind makes it possible for a reflector screen to be electively used with or without LED lamps. The insert can for example comprise an energy storage unit for energy supply of the at least one LED lamp, and/or a retainer, on which an energy storage unit of this kind can be arranged at least temporarily. If the energy storage unit can be releasably fastened on the insert, after discharge of the energy storage unit said unit can be replaced.

Alternatively or in addition, the energy storage unit can comprise an interface for connection of a charging cable.

All the advantages, details, embodiments and/or features of the device according to the invention can be transferred to or are to be applied to the reflector screen according to the invention and/or the insert according to the invention.

The invention will be explained in greater detail with reference to embodiments that are shown in the figures, in which:

FIG. 1 is a schematic view of a device for illuminating a motif region according to an embodiment;

FIG. 2 is a schematic view of a device for illuminating a motif region according to an embodiment;

Figure 4:
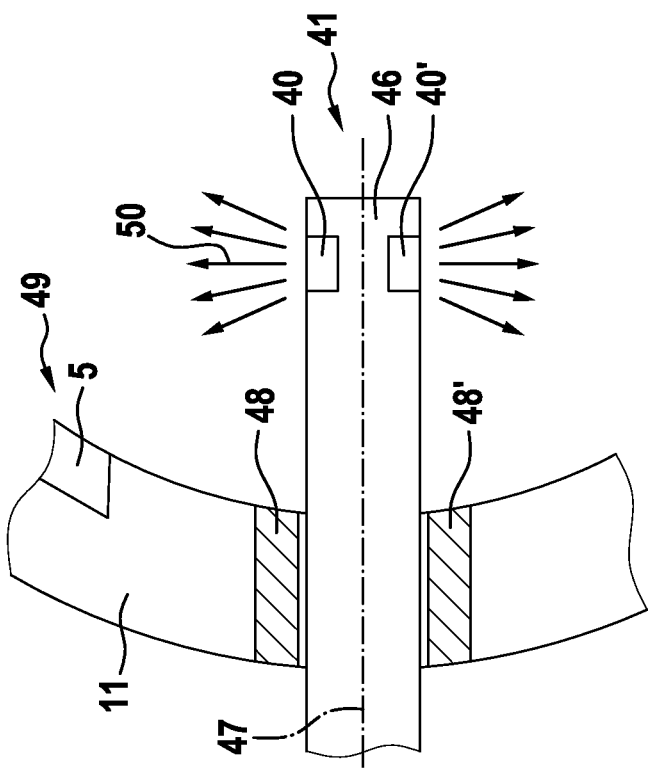
Figure 3:
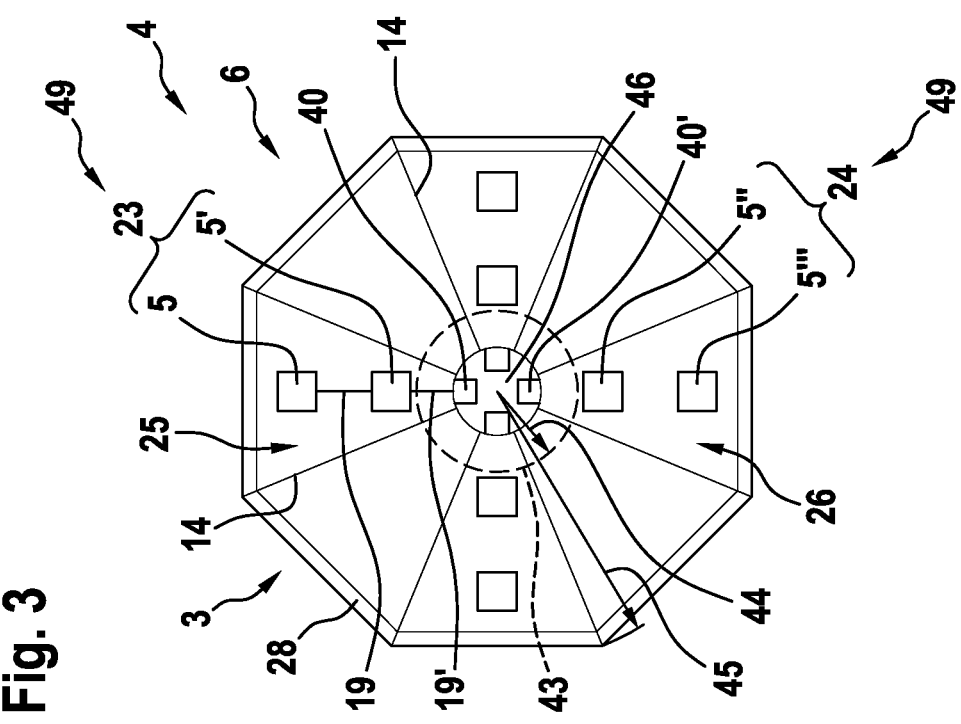
Figure 6:
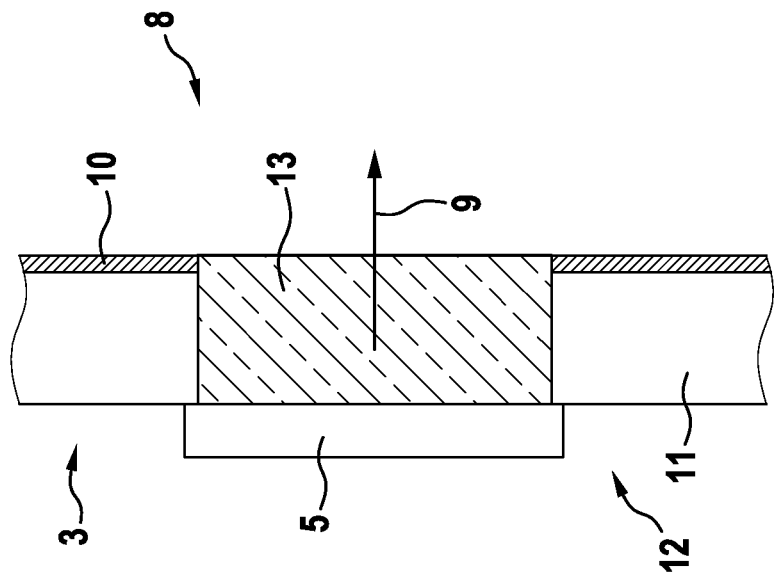
Figure 5:
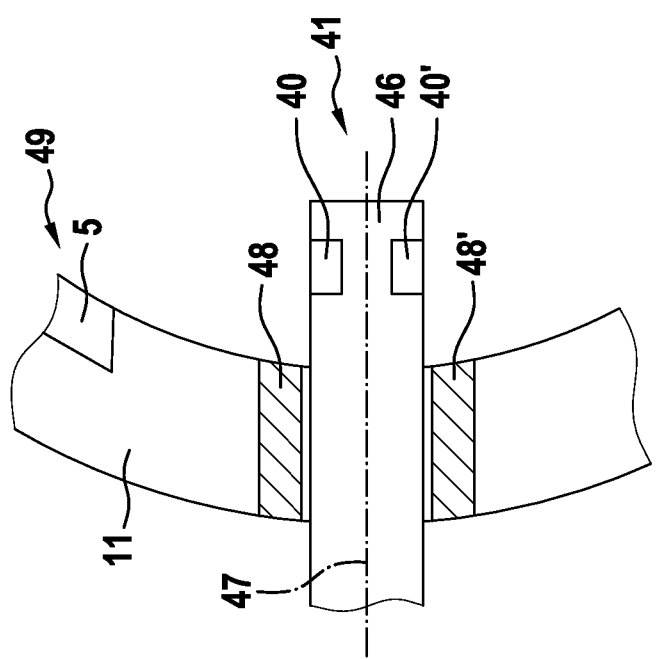
Figure 7:
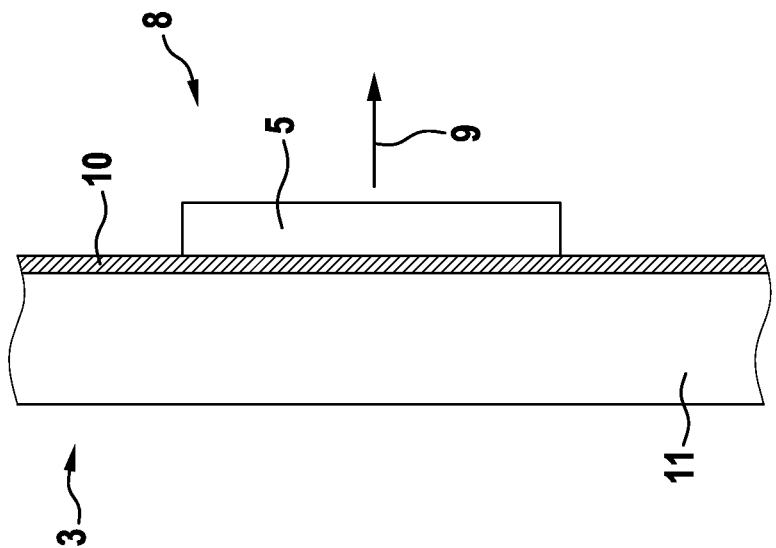
Figure 8:
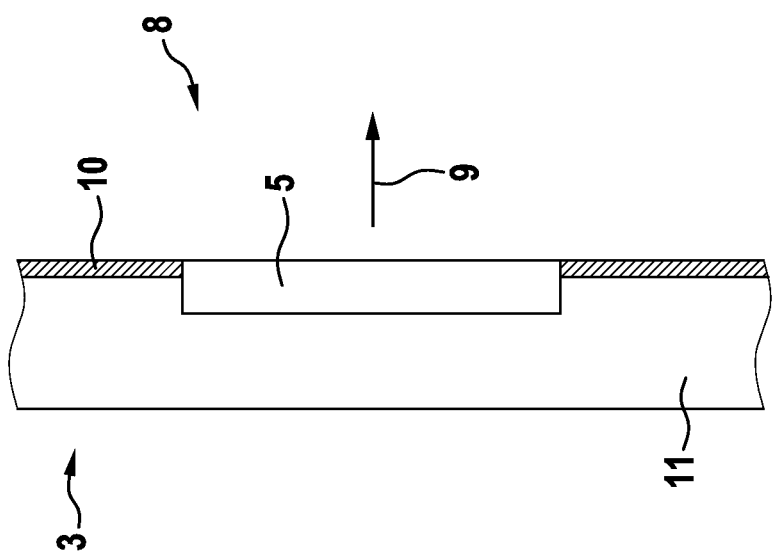
Figure 14:
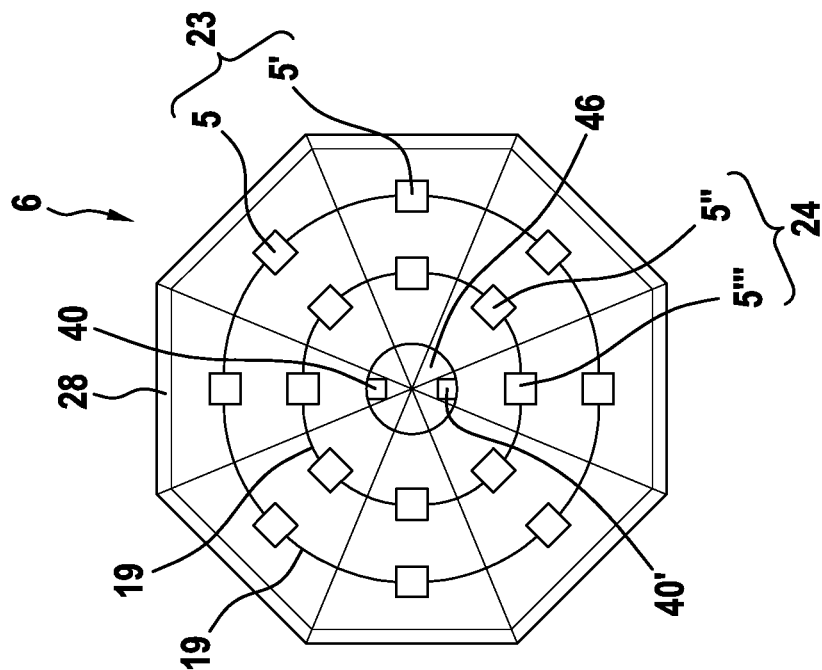
Figure 13:
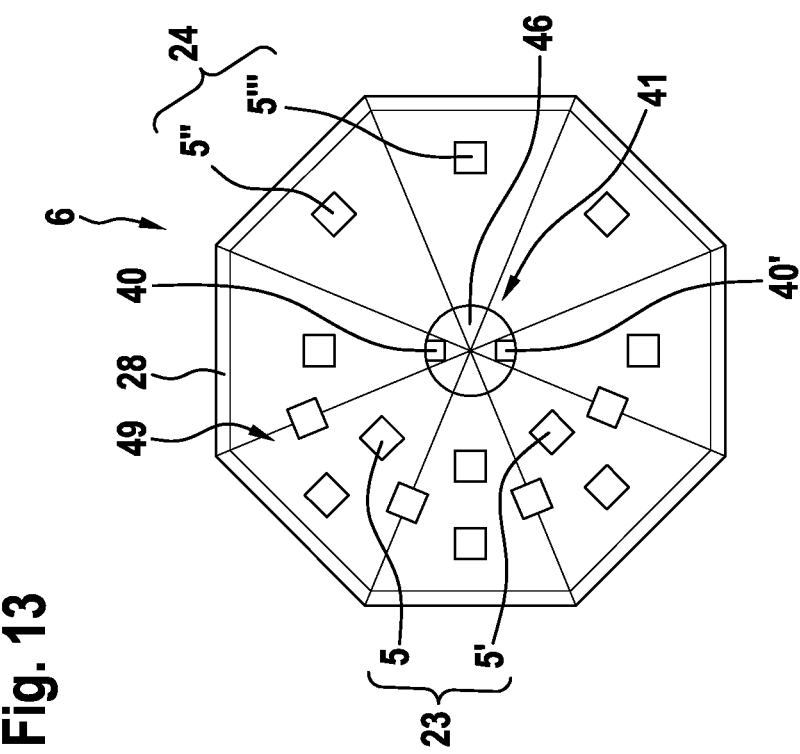

FIG. 3: is a schematic front view of a reflector screen according to FIG. 2;

FIG. 4 is a schematic detailed view of a device for illuminating a motif region relating to the arrangement of a carrier in a first position according to an embodiment;

FIG. 5 is a schematic detailed view of a device for illuminating a motif region relating to the arrangement of a carrier in a second position according to an embodiment;

FIG. 6 is a schematic detailed view of an LED lamp arranged on a reflection element according to an embodiment;

FIG. 7 is a schematic detailed view of an LED lamp arranged in a reflection element according to an embodiment;

FIG. 8 is a schematic detailed view of an LED lamp arranged on a reflection element according to an embodiment;

FIG. 9 is a schematic view of a part of a device for illuminating a motif region according to an embodiment;

FIG. 10 is a schematic view of a part of a device for illuminating a motif region according to an embodiment;

FIG. 11 is a schematic detailed view of an LED lamp arranged on a reflection element according to an embodiment;

FIG. 12 is a schematic view of a part of a device for illuminating a motif region according to an embodiment;

FIG. 13 is a schematic front view of a reflector screen according to an embodiment;

FIG. 14 is a schematic front view of a reflector screen according to an embodiment;

FIG. 15 is a perspective schematic view of a rod-like carrier according to an embodiment.

FIG. 1 shows a device 1 for illuminating a motif region 2 (shown schematically as a circle), comprising a reflector screen 4 that comprises at least one reflection element 3. The device 1 comprises at least one lighting means 41 which comprises at least one LED lamp 40, 40', in particular a plurality of LED lamps 40, 40', and is intended for illuminating the motif region 2, at least in portions.

It may be possible for the at least one reflection element 3 to be designed to form a three-dimensionally shaped, in particular domed (e.g. in an umbrella-like manner), body 6 comprising a light output opening 7, through which light output opening 7 the by a lighting apparatus 41 or by the LED lamps 40, 40' of the lighting apparatus 41 is arranged, at least in portions, in an interior 42 of the three-dimensionally shaped body 6.

In the figures, the reflector screen 4 is shown in each case in the use position or operating position thereof. The reflector screen 4 can be designed so as to be foldable or collapsible at least in portions. For this purpose, it is expedient to design or to mount at least one reflection element 3 so as to be flexible or so as to be movable relative to a further reflection element 3. According to FIG. 1, the reflector screen 4 is designed in the manner of a screen, in particular in the manner of an umbrella equipped with a folding mechanism. For this purpose, a reflection element 3 which is flexible and/or resilient at least in portions can be supported or stretched in the enlarged use position by means of struts 14. The at least one reflection element 3 can be moved from a compact parked position (non-use position) into a tensioned or into a stretched use position. It is possible for at least one temporary fixing to be provided, at least in the use position.

In the embodiment shown, the lighting apparatus 41 or the at least one LED lamp 40, 40' of the lighting apparatus 41 is arranged in a central region 43 of the three-dimensionally shaped body 6. A central region 43 can be understood to be a region which, in a front view (cf. FIG. 3) of the reflection element 3, is located in the centre thereof. The central region 43 can for example be a region 43 described by a radius 44, wherein the radius 44 corresponds to at most 20%, preferably at most 15%, particularly preferably at most 10%, of the maximum radius 45 of the reflection element 3 or of the curved body 6.

The lighting apparatus 41 or the LED lamps 40, 40' of the lighting apparatus 41 can preferably be arranged on an in particular rod-like carrier 46. In this case, the carrier 46 can extend on and/or in parallel with an axis of symmetry of the three-dimensionally shaped body 6.

The at least one LED lamp 40, 40' can for example be movably mounted on the carrier 46. Alternatively or in addition, a carrier 46 carrying at least one LED lamp 40, 40' can be displaced relative to the reflector screen 4 and/or relative to the reflection element 3. In particular, at least one LED lamp 40, 40' is displaceable along a longitudinal axis 47 of the carrier 46 relative to the carrier 46, and/or the carrier 46 is displaceable along the longitudinal axis 47 thereof relative to the reflector screen 4. For this purpose, the carrier 46 can be mounted in a carrier retainer 48, 48' so as to be linearly movable and/or rotationally movable, at least in portions, cf. FIGS. 4 and 5. In this case, the carrier 46 can be displaced for example in parallel and lying on the longitudinal axis 47 thereof, between a first position and a second position that is further into the interior 42 of the three-dimensionally shaped body 6, cf. FIG. 5. The arrows 50 show, by way of example, a possible radiation direction of the light emitted by the LED lamps 40, 40'. Alternatively or in addition, the light emitted by the LED lamps 40, 40' can also be emitted, at least in part, in the direction of the longitudinal axis 47, and thus in a manner oriented directly towards the light output opening 7 (not shown).

The movability of the LED lamp 40, 40' relative to the carrier 46, and/or the movability of the carrier 46 relative to the reflector screen 4, can be blocked or stopped at least temporarily by a blocking means (not shown).

The device 1 can preferably comprise a further lighting apparatus 49 in addition to the lighting apparatus 41, wherein the further lighting apparatus 49 comprises at least one further LED lamp 5, 5', 5", 5''', in particular the at least one further LED lamp 5, 5', 5", 5''' is arranged in or on the reflection element 3 and/or in or on a reflector screen 4. As a result, the device 1 can comprise first LED lamps 40, 40' and further LED lamps 5, 5', 5", 5'''.

The at least one LED lamp 40, 40', 5, 5', 5", 5''' can be arranged or formed in or on the side 8 of the reflection element 3 facing the light output opening 7. This is shown for example in FIG. 8, for example for the further LED lamps 5, 5', 5", 5''', such that said lamps are arranged on the side 8 of the reflection element 3 facing the light output opening 7, wherein the light-emitting region of the LED lamp 5, 5', 5", 5''' faces the light output opening 7; this is indicated by an arrow 9 which schematically shows the main propagation direction of the light emitted by the LED lamps 5, 5', 5", 5'''.

The reflection element 3 can be provided with a coating 10, which in particular forms a reflective surface. In the use position of the device 1, the coating 10 is oriented, as intended, in the direction of the motif region 2. The LED lamp 5, 5', 5", 5''', 40, 40' can be fastened on the coating 10 and/or on a main body 11 of the reflection element 3.

For example, the fastening of the at least one LED lamp 5, 5', 5", 5''', 40, 40' on the reflection element 3, in particular on the main body 11, is achieved by means of an integral, force-fitting, and/or interlocking connection. For example, the at least one LED lamp 5, 5', 5", 5''', 40, 40' can be fastened at least in an integral manner to the reflection element 3 or to a three-dimensionally shaped body 6 by means of an adhesive and/or by means of a gel. For example, the at least one LED lamp 5, 5', 5", 5''' is cast or packed onto the three-dimensionally shaped body 6 or onto the main body 11.

It is also possible for example for the main body 11 of the reflection element 3 to be produced in a plastics injection moulding process, wherein in this case the at least one LED lamp 5, 5', 5", 5''' is moulded into the main body 11.

The LED lamps 5, 5', 5", 5''' can be fastened at least integrally to the reflector screen 4, the reflection element 3 and/or the insert 32, for example by means of a curable mass, e.g. by means of a gel. In other words, for example at least one lamp 5, 5', 5", 5''' can be fastened to the three-dimensional body 6 by means of a gel or in a manner encased in a gel.

The coating 10 at least of the side 8 of the reflection element 3 facing the light output opening 7 can be designed so as to be white, silver and/or gold in colour, at least in portions. In general, the colour property (e.g. white, silver and/or gold-coloured) mentioned, on the side 8 of the reflection element 3 facing the light output opening 7, can also be generated at least in portions in a production process that is not based on a coating 10, e.g. by weaving correspondingly coloured threads into a woven fabric of the reflection element 3 and/or by colouring the reflection element 3, at least in portions, in the corresponding colours.

All or at least at least one LED lamp(s) 5, 5', 5", 5''', 40, 40' of the device 1 can for example be arranged on the side 12 of the reflection element 3 remote from the light output opening 7, cf. FIG. 6. In this case, the reflection element 3 can comprise a transparent region 13 and/or an opening through which the light emitted by the LED lamps 5, 5', 5", 5''', 40, 40' arranged on the side 12 of the reflection element 3 remote from the light output opening 7 passes in order to illuminate the motif region 2 via the 7 light output opening. For this purpose, the main body 11 of the reflection element 3 can comprise corresponding apertures and/or transparent regions 13.

It is furthermore possible to arrange at least one LED lamp 5, 5', 5", 5''', 40, 40' in the reflection element 3, at least in portions; for this purpose, the LED lamp 5, 5', 5", 5''', 40, 40' can be incorporated in the material that forms the reflection element 3 at least in portions. For example, the reflection element 3 comprises a double layer of a flexible material, wherein at least one LED lamp 5, 5', 5", 5''', 40, 40' is placed, in particular incorporated, in the intermediate region of the double layer, at least in portions, cf. FIG. 7. It is also possible for example for the main body 11 of the reflection element 3 to be produced in a plastics injection moulding process, wherein in this case the at least one LED lamp 5, 5', 5", 5''', 40, 40' is moulded into the main body 11, at least in portions.

At least one LED lamp 5, 5', 5", 5''', 40, 40' can also be indirectly or directly fastened on a strut 14 and/or joint (not shown) of the three-dimensional, in particular domed, body 6, forming a component of a folding mechanism 15.

The at least one LED lamp 5, 5', 5", 5''', 40, 40' can be releasably or non-releasably fastened in or on the reflector screen 4, in particular in or on the reflection element 3. For example, at least one LED lamp 5, 5', 5", 5''', 40, 40' is connected to the reflection element 3 by means of a hook and loop connection (not shown).

The reflector screen 4 can comprise a folding mechanism 15 and an in particular flexible and/or resilient reflection element 3, wherein the reflection element 3 can be displaced, by the folding mechanism 15, between an, in particular stretched, use position and an, in particular folded, non-use position. Alternatively, the reflector screen 4 can be changed or mounted in an assembly of a configuration consisting of a plurality of individual parts, in an assembled configuration of the individual parts, in particular the reflection elements 3, that forms the three-dimensional body 6.

In FIG. 2, an, in particular rechargeable, electrical energy storage unit 16 for energy supply of the at least one LED lamp 5, 5', 5", 5''', 40, 40' is arranged in or on the device 1 or in or on the reflector screen 4, in particular the energy storage unit 16 is releasably fastened on the reflector screen 4. The energy storage unit 16 can for example be able to be fastened on a reflection element 3 or, as shown, on a base element 17 of the reflector screen 4. The base element 17 can be the, in particular direct, connection of the at least one reflection element 3 to a stand 18 that carries the reflection element 3 and supports it relative to an installation surface. The arrangement of the at least one energy storage unit 16, used for energy supply of the LED lamp 5, 5', 5", 5''', 40, 40', on the base element 17 allows for an at least temporary rigid connection of the energy storage unit 16 to the stand 18, and thereby facilitates the manipulability of the device 1, since, if applicable, an oscillation or a relative movement of the stand 18 (typically the element that is directly grasped by the hand) relative to the energy storage unit 16 is prevented. A connection interface provided for connection of the energy storage unit 16 to the reflector screen 4 can allow for a force-fitting and/or interlocking connection. The connection interface is designed for example as a standard interface, e.g. the connection interface can be designed as what is known as a V-mount connection.

The at least one LED lamp 5, 5', 5", 5''', 40, 40' can be connected to the energy storage unit 16 via an electrical line connection 19, 19', wherein the line connection 19, 19' is arranged or designed such that the line connection 19, 19' undergoes no or one bend, in particular no or one fold, during a displacement of the reflection element 3 between the use position and the non-use position; preferably the line connection 19, 19' is designed so as to extend at least largely radially with respect to a fold centre 20 of the reflector screen 4. As shown in FIG. 3, the struts 14 extend radially from the fold centre 20 of the reflector screen 4, and line connections 19, 19' also extend radially from the fold centre 20, such that, in the case of a reflector screen 4 that folds together in an umbrella-like manner, the line connections 19, 19' do not undergo bending, since they do not extend over the struts 14. Alternatively or in addition, at least one line connection 19, 19' can extend or be arranged in or on a strut 14 of the reflector screen 4, at least in portions.

Alternatively or in addition, it may be possible for at least one LED lamp 5, 5', 5", 5''', 40, 40' to be releasably or non-releasably fastened in or on a strut 14 of the reflector screen 4, in particular of the reflection element 3. It is also possible for at least one LED lamp 5, 5', 5", 5''', 40, 40' to be arranged in an interior of a strut 14 of the reflector screen 4 formed having a cavity at least in portions. For this purpose, the strut 14 designed as a hollow body at least in portions can comprise at least one light output opening 7 for allowing the light emitted by the at least one LED lamp 5, 5', 5", 5''', 40, 40' to pass through. Alternatively or in addition, at least one LED lamp 5, 5', 5", 5''', 40, 40' can be fastened on a strut by means of a force-fitting and/or interlocking connection hook and loop connection.

It is furthermore possible for a control unit 21 to be provided, which can be or is associated with the at least one LED lamp 5, 5', 5", 5''', 40, 40', by means of which the lighting intensity and/or the colour temperature and/or the light colour of the at least one LED lamp 5, 5', 5", 5''', 40, 40' can be changed. The control unit 21 can be arranged in or on a housing 22, together with the energy storage unit 16, cf. FIG. 2. Alternatively, the control unit 21 and the energy storage unit 16 can be fastened on the device 1 as separate and mutually spaced components or modules (not shown).

It may be possible for a plurality of LED lamps 5, 5', 5", 5''', 40, 40' to be arranged on the reflector screen 4 in a grouped manner. A first group 23 of for example two LED lamps 5, 5', and a second group 24 of for example two LED lamps 5", 5''', wherein the first and the second group 23, 24 of LED lamps 5, 5', 5", 5''' can be actuated independently of one another by means of a control unit 21 which can be or is associated with the first and second group 23, 24 of LED lamps 5, 5', 5", 5'''. It is thus possible for group-specific actuation of the LED lamp-specific parameters of the LED lamps 5, 5', 5", 5''' to take place.

It is possible, both in the case of using LED lamps 5, 5', 5", 5''', 40, 40' which are variable with respect to the light characteristics thereof, and in the case of LED lamps 5, 5', 5", 5''', 40, 40' which are not variable with respect to the light characteristics thereof, that a first group 23 of at least one LED lamp 5, 5' and a second group 24 of at least one LED lamp 5", 5''' differ in at least one parameter of the light that can be emitted thereby, in each case. The selective or elective actuation of the LED lamps 5, 5', 5", 5''', 40, 40' of the first or of the second group 23, 24 can thus allow for the generation of a desired illumination or shadow effect. The grouping, and thus also the variability of the lighting properties of the LED lamps 5, 5', 5", 5''', 40, 40' can include the first LED lamps 40, 40' and/or the further LED lamps 5, 5', 5", 5'''.

As shown in FIG. 3, it is possible that, in particular exclusively, a first group 23 of LED lamps 5, 5', in the use position of the reflector screen 4, may be arranged in a first sector portion 25 located between two lines or struts 14 that extend radially from a fold centre 20 of the reflector screen 4 that is in the use position. It is possible for, in particular exclusively, at least one LED lamp 5", 5''' of a second group 24 of LED lamps 5", 5''' to be arranged in at least one further sector portion 26.

Alternatively or in addition, the at least two groups 23, 24 of LED lamps 5, 5', 5", 5''', 40, 40' can be arranged in and/or on regions extending from the centre (e.g. fold centre 20) of the reflector screen 4, in an annular manner, in groups, in particular at least in portions, and so as to be equidistant. That is to say that the LED lamps 5, 5', 5", 5''', 40, 40' of a first group 23 are at a first distance from the centre of the reflector screen 4, and a second group 24 of LED lamps 5, 5', 5", 5''', 40, 40' are at a second distance, different from the first distance, from the centre of the reflector screen 4, in particular of the reflection element 3. These annular portions can be of an annular shape following an annulus or the cross-sectional shape of the reflector screen 4, in particular of the reflection element 3, e.g. the shape of a regular polygon, cf. FIG. 14. In this case, the at least two groups 23, 24 of LED lamps 5, 5', 5", 5''', 40, 40' can be electrically connected to one another and/or to a control unit 21 and/or to an electrical energy storage unit 16, via line connections 19 which also extend annularly around the centre, e.g. the fold centre 20. It is also possible for at least two LED lamps 5, 5', 5", 5''', 40, 40' to be releasably fastened in or on a reflector screen 4, in particular on a reflection element 3, as an insert 32. In this case, the LED lamps 5, 5', 5", 5''', 40, 40' can also be able to be fastened to the reflector screen 3 as a plurality of inserts 32 which are annular in each case. Finally, the LED lamps 5, 5', 5", 5''', 40, 40' can also be mountable on the reflector screen 3 as an LED lamp chain, at least in part. In this case, the LED lamp chain can be mounted on the reflector screen 3 for example so as to be helical at least in portions (not shown).

According to the embodiment shown in FIG. 13, the LED lamps 5, 5', 5", 5''', 40, 40' can be arranged on the reflector screen 4, or on the at least one reflection element 3 that forms the three-dimensional body 6, so as to be asymmetrical, at least in portions. Thus, the LED lamps 5", 5''' assigned to the second group 24 are placed in a region of the reflector screen 4, in particular of the reflection element 3, provided with fewer, in particular activated, LED lamps 5, 5', 5", 5''', whereas the LED lamps 5, 5' assigned to the first group 23 are placed in a reflection element of the reflector screen 4, in particular of the reflection element 3, which contains a higher density of LED lamps 5, 5', 5", 5''', 40, 40', i.e. more LED lamps 5, 5', 5", 5''', 40, 40' per surface portion, which lamps are in particular actively operated.

For example, a connection region 28 for at least temporary connection to an attachment element 27 can be arranged or formed on an outer edge region of the light output opening 7 or on an outer edge region of the reflector screen 4 or on the free end of the attachment element one reflection element 3. The attachment element 27 can for example be a diffusor, a spot attachment, a shielding flap, a mask, a foil filter, a glass colour filter, and/or a honeycomb filter attachment. In this case, the attachment element 27 can have an altering effect on the light emerging from the reflector screen 4; in particular, the attachment element 27 can perform a diffusor and/or colour filter effect. By way of example, in FIG. 10 a diffusor formed as a substantially stretched surface body, in particular as a white sheet, is fastened together with the reflector screen 4 by means of the connection region 28 arranged at the free end of the reflection element 3. Alternatively or in addition, as shown by way of example in FIG. 12, a first attachment element 27 can cover the light output opening 7, i.e. the region of the reflector screen 4, in particular of the reflection element 3, facing the motif region 2 can be bridged at least in portions, and in addition or alternatively a further attachment element 27' can cover, at least in portions, or change the emission characteristics of LED lamps 5, 5', 5", 5''' arranged or formed on the rear face of the reflector screen 4, in particular on the rear face of the reflection element 3, by means of corresponding connection regions 28'. The light emission of the attachment element 27' influencing LED lamps 5, 5', 5", 5''' arranged on the rear face can alternatively also be used without the attachment element 27 which covers the light output opening 7 at least in portions.

The energy supply, in particular the power supply, of the first LED lamps 40, 40' and of the further LED lamps 5, 5', 5", 5''' can for example be achieved by a single or by separate energy storage unit(s) 16. For example, the at least one LED lamp 40, 40' of the first lighting apparatus 41 can have an energy storage means or energy supply that is independent of the further LED lamps 5, 5', 5", 5''' of the further lighting apparatus 49. It is also possible for the at least one LED lamp 40, 40' of the first lighting apparatus 41 to be directly connected to an energy source (power supply) or to a voltage source, e.g. by means of a power cable, while the further LED lamps 5, 5', 5", 5'" are supplied with electricity by means of the energy storage unit 16 that is at least temporarily exclusively associated therewith.

As shown by way of example in FIG. 2, at least one ventilation opening 30 can be provided, through which air or an airflow 31 can pass, in particular flow, through between the side 8 of the reflector screen 4 facing a light output opening 7 and a side 12 of the reflector screen 4 remote from the light output opening 7, at least in the use state of the reflector screen 4. By means of said airflow 31, at least one further LED lamp 5, 5', 5", 5'" of the further lighting apparatus 49, and/or at least one first LED lamp 40, 40' of the first lighting apparatus 41, can be cooled. For this purpose, at least one, in particular all, ventilation opening(s) 30 can be arranged or formed close to the further LED lamp 5, 5', 5", 5'" of the further lighting apparatus 49, and/or close to the at least one first LED lamp 40, 40' of the first lighting apparatus 41. At least the at least one ventilation opening 30 can be arranged close to an LED lamp 5, 5', 5", 5'", 40, 40', such that the airflow 31 flowing through the ventilation opening 30 is suitable for cooling the at least one LED lamp 5, 5', 5", 5'", 40, 40'.

It may be possible, for example, for a reflector screen 4 to be prepared for use with at least one LED lamp 5, 5', 5", 5'", 40, 40'. For this purpose, the reflector screen 4 can comprise an attachment portion, in or on which the at least one LED lamp 5, 5', 5", 5'", 40, 40' can be indirectly or directly fastened. This fastening of the LED lamp 5, 5', 5", 5'", 40, 40' can be implemented so as to be releasable or non-releasable. According to the embodiment in FIG. 9, the LED lamps 5, 5', 5", 5'" are arranged on a carrier body 33 or an insert 32, and are fastened in a force-fitting, interlocking and/or integral manner to the reflector screen 4, in particular to the reflection element 3, by means of fastening the insert 32 by connection portions 34.

As in the preceding embodiments, the energy supply of the LED lamps 5, 5', 5", 5'", 40, 40' which can be mounted on the reflection element 3 as a group or via an insert 32 can be arranged, in particular releasably, on a base body 17 or on other locations of the reflector screen 4 or reflection element 3. It is explicitly also possible to arrange the energy storage unit 16, for supplying at least some of the LED lamps 5, 5', 5", 5'", 40, 40' that are to be mounted on the reflector screen 4 via the insert 32, in or on the insert 32, in particular in or on the carrier body 33 of the insert 32, such that a module that can intrinsically already be used for (test) operation of the LED lamps 5, 5', 5", 5'", 40, 40' is formed by a module or insert 32 comprising the carrier body 33, the at least one LED lamp 5, 5', 5", 5'", and the energy storage unit 16.

It may thus be advantageous for example if, although the carrier body 33 of the insert 32 rigidly, or even to a certain extent resiliently, interconnects the LED lamps 5, 5', 5", 5'", 40, 40', the carrier body 33 itself is designed so as to be flexible. As a result, the pack size in the non-use state of the carrier body 33 and the cohesively interconnected LED lamps 5, 5', 5", 5'", 40, 40' can be reduced. The shape or the support and stability function for the LED lamps 5, 5', 5", 5'", 40, 40' arranged on a carrier body 33 of this kind can be achieved via the reflector screen 4, in particular via the at least one reflection element 3, which has a corresponding rigidity, at least in the use position.

The reflective property for reflecting light of the at least one LED lamp 5, 5', 5", 5'", 40, 40', or the reflective function of the device 1 or of the reflection element 3, can be fulfilled entirely or in part by the carrier body 33; for this purpose, the carrier body 33 has a reflective property, at least in portions, at the surface or side thereof facing the light output opening 7 in the final mounting state, for influencing the light emitted from the at least one LED lamp 5, 5', 5", 5'", 40, 40'.

The insert 32 can thus be mounted on a device 1 for illuminating a motif region 2, wherein the device 1 comprises a reflector screen 4 that comprises a reflection element 3, and the insert 32 comprises at least one LED lamp 5, 5', 5", 5'", 40, 40', in particular a plurality of LED lamps 5, 5', 5", 5'", 40, 40', and the insert 32 can be arranged in or on the reflector screen 4, in particular in or on the reflection element 3, wherein in the mounted state of the insert 32 in or on the reflector screen 4, the at least one LED lamp 5, 5', 5", 5'", 40, 40' can be used for illuminating a motif region 2, at least in portions.

The insert 32 can for example comprise an energy storage unit 16 for energy supply of the at least one LED lamp 5, 5', 5", 5'", 40, 40', in particular the energy storage unit 16 is releasably fastened on the insert 32.

FIGS. 10, 11 and 12 show an embodiment which comprises the arrangement of the further LED lamps 5, 5', 5", 5'" of the further lighting apparatus 49 on a side 12 of the reflector screen 4, in particular of the at least one reflection element 3, remote from the motif region 2. The light emitted by said further LED lamps 5, 5', 5", 5'" of the further lighting apparatus 49 reaches the motif region 2 indirectly, i.e. only after a deflection or reflection taking place typically at a cover and/or at a wall, and achieves a light or shadow effect typical therefor. In this case, the reflection element 3 forms an obstacle that obstructs the light propagation of the LED lamps 5, 5', 5", 5'" directly to the motif region 2, and at the same time forms the carrier structure for the LED lamps 5, 5', 5", 5'" that illuminate the motif region 2 at least indirectly.

It is alternatively or in addition possible for a device 1 to comprise at least one first and/or further LED lamp 5, 5', 5", 5'", 40, 40' that directly illuminates the motif region 2, and additionally at least one further LED lamp 5, 5', 5", 5'" that indirectly illuminates the motif region 2. As a result, a light and shadow effect can be achieved on the motif region 2 to be illuminated, which effect has both direct and indirect illumination effects. It may optionally be possible for a reflector screen 4, in particular a reflection element 3, to comprise connection points for at least temporary fastening of at least one LED lamp 5, 5', 5", 5'", 40, 40', on the side which, as intended, faces a motif region 2, as well as on the side which, as intended, is remote from a motif region 2. As a result, the at least one LED lamp 5, 5', 5", 5'", 40, 40' can selectively be arranged on the side facing the motif region 2 and/or on the side remote from the motif region 2, by means of a device 1 or by means of a reflector screen 4. Particularly preferably at least one, in particular all, line connection 19 is arranged in or on the reflector screen 4, in particular the reflection element 3, such that the power supply of the LED lamps 5, 5', 5", 5'", 40, 40' can be achieved by the at least one line connection 19, irrespective of the side (facing or remote from the motif region 2, as intended) on which they are arranged. For this purpose, electrical energy supply interfaces (not shown) which are connected to the electrical line connection 19 can be arranged or formed in or on the reflector screen 4, in particular in or on the reflection element 3, in such a way that a power supply can be implemented via the energy supply interface, irrespective of the side (facing or remote from the motif region 2, as intended) on which the at least one LED lamp 5, 5', 5", 5'", 40, 40' is placed. That is to say that for example the energy supply interface comprises a component or a module which comprises two mutually opposing contact points for optional or simultaneous electrical and/or mechanical connection to an LED lamp 5, 5', 5", 5''', 40, 40' (not shown).

Alternatively or in addition to a folding mechanism 15, a plug-in mechanism or a plug-in structure can be used, in order to form or assemble components of the reflector screen 4, in particular one or more reflection elements 3, for forming the device for the state of the intended use. For example, at least one strut 14, used in particular for retaining or supporting and/or carrying at least one reflection element 3, can be pluggable into a central element. In other words, at least one strut 14 can hold in particular flexible reflection elements 3 in a stretched shape or in a widened use position.

It is thus possible for an assembly to take place, wherein for example plugging together of components of the reflector screen 4, in particular plugging together of reflection elements 3 and/or struts 14 holding reflection elements 3, to one another or to an in particular central carrier body, e.g. a base element 17, takes place.

The insert 32 may comprise an opening for guiding through the carrier 46. For example in the final mounting state of the insert 32 on the reflector screen 4 and/or on the reflection element 3, the carrier 46 can engage through the opening of the insert 32, at least in portions.

FIG. 15 shows an in particular rod-shaped carrier 46 which is made up of at least one carrier body 51, 51', 51", in particular of at least two carrier bodies 51, 51', 51". The at least two carrier bodies 51, 51' can be arranged so as to be spaced apart from one another, at least in portions, and can form an intermediate space or a receiving chamber therebetween. An LED lamp can be received in the intermediate space or receiving chamber. A gap or a through-opening, for example, can be present between the at least one LED lamp 40, 40', 40", 40''' and a carrier body 51, 51', 51", and/or between at least two carrier bodies 51, 51', 51", and/or between at least two, in particular adjacent, LED lamps 40, 40', 40", 40'''. A gap of this kind (not shown) and/or a through-openings of this kind can serve to conduct through air, in particular for cooling the LED lamps 40, 40', 40", 40'''.

At least one carrier body 51, 51', 51", in particular all the carrier bodies 51, 51', 51" of the carrier 46, can have an elongate, preferably rod-like, shape. As shown in FIG. 15, the carrier bodies 51, 51', 51" can be arranged or formed in an arrangement relative to one another that has a square, in particular a quadratic or a rectangular, basic shape. Alternatively, the carrier bodies 51, 51', 51" can be oriented in an arrangement relative to one another that forms a triangular and/or pentagonal and/or n-gonal and/or circular and/or ellipsoid and/or oval basic shape. In this case, the basic chape can form a regular and/or uniform geometric body. The carrier bodies 51, 51', 51", 51''' and/or the LED lamps 40, 40', 40", 40''' are preferably present or arranged relative to one another in a basic shape, and extend in the manner of a cylinder provided with just such a basic shape. The carrier bodies 51, 51', 51" and/or the LED lamps 40, 40', 40" arranged in the intermediate spaces or receiving chambers can for example have a basic shape which is triangular and/or round and/or n-gonal, at least in portions.

In a preferred embodiment, the carrier 46 is formed for example by two, preferably three, particularly preferably four, most preferably by at least five, elongate carrier bodies 51, 51', 51", which are in particular arranged so as to be in parallel with one another.

The carrier bodies 51, 51', 51" can be mutually supported or interconnected, in particular exclusively, by the LED lamps 40, 40', 40", and/or, in particular exclusively, by support means (not shown).

LIST OF REFERENCE SIGNS 1 device
2 motif region
3 reflection element
4 reflector screen
5, 5', 5", 5''' LED lamp
6 three-dimensionally shaped body
7 light output opening
8 side of 3
9 main propagation direction
10 coating
11 main body
12 side of 3
13 transparent region of 3
14 strut
15 folding mechanism
16 energy storage unit
17 base element
18 stand
19, 19' line connection
20 fold centre
21 control unit
22 housing
23 first group
24 second group
25 first sector portion
26 second sector portion
27, 27' attachment element
28, 28' connection region
30 ventilation opening
31 airflow
32 insert
33 carrier body
35 connection portion
40, 40', 40", 40''' LED lamps
41 lighting apparatus
42 interior of 6
43 central region
44 radius of 43
45 maximum radius
46 carrier
47 longitudinal axis
48, 48' carrier retainer
49 further lighting apparatus
50 arrow
51, 51', 51" carrier body

The invention claimed is:
1. A device for illuminating a motif region, comprising:
a reflector screen comprising at least one reflection element that is movable from a compact non-use position into an expanded position of use:
a carrier extending on or in parallel with an axis of symmetry of the at least one reflection element; and
a plurality of LED lamps mounted on the carrier such that the plurality of LED lamps is arranged on an outer perimeter of the carrier in a common plane around the outer perimeter of the carrier, the common plane being perpendicular to a longitudinal axis of the carrier, and at least one of the plurality of LED lamps being configured to emit light radially from the carrier relative to the longitudinal axis of the carrier for illuminating the motif region, wherein the carrier is a rod-shaped carrier, and at least one LED lamp of the plurality of LED lamps is movably mounted on the rod-shaped carrier, such that the at least one LED lamp is displaceable relative to the reflector screen, is displaceable relative to the at least one reflection element, and/or is displaceable along a direction of the longitudinal axis of the rod-shaped carrier.

2. The device according to claim 1, wherein the at least one reflection element is configured to form a three-dimensionally shaped, curved body comprising a. light output opening, through which light output opening light emitted by at least one of the plurality of LED lamps can escape to the motif region;and wherein the plurality of LED lamps is arranged in an interior of the three-dimensionally shaped, curved body.

3. The device according to claim 2, wherein the plurality of LED lamps is arranged in a central region of the three-dimensionally shaped, curved body.

4. The device according to claim 1, wherein the movability of the at least one LED lamp relative to the rod-shaped carrier, and/or the movability of the rod-shaped carrier relative to the reflector screen, can be blocked at least temporarily by a blocking means.

5. The device according to claim 1, further comprising at least one further LED lamp arranged in or on the at least one reflection element.

6. The device according to claim 5, wherein the at least one further LED lamp is releasably or non-releasably fastened in or on the at least one reflection element.

7. The device according to claim 1, wherein the reflector screen comprises a folding mechanism and a flexible reflection element, wherein the at least one reflection element can be displaced, by the folding mechanism, between a stretched, use position and a folded, non-use position.

8. The device according to claim 7, wherein a rechargeable, electrical energy storage unit for energy supply of at least one LED lamp of the plurality of LED lamps is arranged releasably fastened in or on the reflector screen.

9. The device according to claim 8, wherein the at least one LED lamp of the plurality of LED lamps is connected to the energy storage unit via an electrical line connection, wherein the electrical line connection is configured such that the electrical line connection undergoes no or one bend or no or one fold, during a displacement of the at least one reflection element between the use position and the non-use position and/or the electrical line connection is configured to extend at least largely radially with respect to a fold centre of the reflector screen.

10. The device according to claim 1, further comprising a control unit associated with at least one LED lamp of the plurality of LED lamps by which a lighting intensity and/or a colour temperature and/or a light colour of the at least one LED lamp can be changed.

11. The device according to claim 1, further comprising a first group comprising at least one LED lamp of the plurality of LED lamps and a second group comprising at least one LED lamp of the plurality of LED lamps, wherein the first group of LED lamps and the second group of LED lamps can be actuated independently of one another through a control unit associated with the first group of LED lamps and the second group of LED lamps.

12. The device according to claim 1, further comprising a first group comprising at least one LED lamp of the plurality of LED lamps and a second group comprising at least one LED lamp of the plurality of LED lamps, wherein the at least one LED lamp of the first group differs from the at least one LED lamp of the second group in at least one parameter of light emitted thereby.

13. The device according to claim 1, further comprising a connection region arranged or formed in or on the reflector screen, in or on the at least one reflection element, and/or in or on an edge region of the light output opening, for at least temporary connection of the connection region to an attachment element, wherein the attachment element is a diffusor, a spot attachment, a shielding flap, a mask, a foil filter, a glass colour filter, and/or a honeycomb filter attachment.

14. The device according to claim 1, further comprising a plurality of additional LED lamps mounted on the carrier such that the plurality of additional LED lamps are arranged in one or more additional common planes around the outer perimeter of the carrier, the one or more additional common planes being perpendicular to the longitudinal axis of the carrier, and each of the one or more additional common planes being axially distanced from the common plane of the plurality of LED lamps.

15. The device according to claim 14, wherein at least one of the plurality of additional LED lamps is configured to emit light radially from the carrier relative to the longitudinal axis of the carrier for illuminating the motif region.

16. An insert for mounting on a. device for illuminating a motif region, the device comprising a reflector screen comprising a reflection element that is movable from a compact non-use position into an expanded position of use, the insert comprising:

a carrier configured to extend on or in parallel with an axis of symmetry of the reflection element; and a plurality of LED lamps mounted on the carrier such that the plurality of LED lamps is arranged in a common plane around an outer perimeter of the carrier, the common plane being perpendicular to a longitudinal axis of the carrier, and at least one of the plurality of LED lamps being configured to emit light radially from the carrier relative to the longitudinal axis of the carrier, wherein the insert is configured for arrangement in or on the reflector screen and/or in or on the reflection element;

wherein the at least one LED lamp directly and/or indirectly illuminates the motif region, wherein the carrier is a rod-shaped carrier, and at least one LED lamp of the plurality of LED lamps is movably mounted on the rod-shaped carrier, such that the at least one LED lamp is displaceable relative to the reflector screen, is displaceable relative to the at least one reflection element, and/or is displaceable along a direction of the longitudinal axis of the rod-shaped carrier.

17. The insert according to claim 16, wherein the insert comprises an energy storage unit for energy supply of at least one LED lamp of the plurality of LED lamps, the energy storage unit being releasably fastened on the insert.

18. A device for illuminating a motif region, comprising:

a reflector screen comprising at least one reflection element that is movable from a compact non-use position into an expanded position of use;

a carrier extending on or in parallel with an axis of symmetry of the at least one reflection element; and a plurality of LED lamps mounted on the carrier such that the plurality of LED lamps is arranged on an outer perimeter of the carrier in a common plane around the outer perimeter of the carrier, the common plane being perpendicular to a longitudinal axis of the carrier, and at least one of the plurality of LED lamps being configured to emit light radially from the carrier relative to the longitudinal axis of the carrier for illuminating the motif region,
wherein the carrier is a rod-shaped carrier, and
the rod-shaped carrier is moveable on or in parallel with the axis of symmetry of the at least one reflection element, such that the rod-shaped carrier carrying at least one LED lamp can be displaced relative to the reflection element during the use position of the reflection element, and the movability of the rod-shaped carrier relative to the reflector screen, can be blocked at least temporarily by a blocking means.

* * * * *